United States Patent
Enns

(10) Patent No.: US 8,020,926 B2
(45) Date of Patent: Sep. 20, 2011

(54) VEHICULAR STRUCTURAL FRAME ASSEMBLY

(76) Inventor: John L. Enns, La Salle (CA)

(*) Notice: Subject to any disclaimer, the term of this patent is extended or adjusted under 35 U.S.C. 154(b) by 3 days.

(21) Appl. No.: 12/755,524

(22) Filed: Apr. 7, 2010

(65) Prior Publication Data

US 2010/0259071 A1 Oct. 14, 2010

Related U.S. Application Data

(60) Provisional application No. 61/167,546, filed on Apr. 8, 2009.

(51) Int. Cl.
*B60N 99/00* (2006.01)

(52) U.S. Cl. .............. 296/193.12; 296/187.01

(58) Field of Classification Search ........... 296/187.01, 296/187.08, 187.13, 193.01, 193.07, 193.12, 296/203.01, 204
See application file for complete search history.

(56) References Cited

U.S. PATENT DOCUMENTS

| 1,677,577 | A | * | 7/1928 | Amiot ........................... 296/204 |
| 4,066,227 | A | | 1/1978 | Buchsel |
| 4,645,258 | A | * | 2/1987 | Ohmura et al. ............... 296/204 |
| 5,417,453 | A | * | 5/1995 | VanDenberg .................. 296/204 |
| 6,245,415 | B1 | * | 6/2001 | Keller et al. ............ 296/187.01 |
| 6,296,300 | B1 | * | 10/2001 | Sato ........................ 296/187.08 |
| 6,375,249 | B1 | | 4/2002 | Stanton et al. |
| 6,805,401 | B2 | * | 10/2004 | Hayashi et al. ............... 296/204 |
| 7,118,069 | B2 | | 10/2006 | Novak et al. |
| 2003/0080251 | A1 | | 5/2003 | Anast |
| 2006/0091640 | A1 | * | 5/2006 | Reese et al. ................... 296/204 |
| 2007/0241587 | A1 | * | 10/2007 | Fleming ................... 296/203.01 |
| 2009/0256399 | A1 | * | 10/2009 | Sherbeck et al. ............. 296/204 |

* cited by examiner

*Primary Examiner* — Lori Lyjak
(74) *Attorney, Agent, or Firm* — Ryan W. Dupuis; Kyle R. Satterthwaite; Ade & Company Inc.

(57) ABSTRACT

A structural vehicular frame assembly includes an inner panel of interconnected flange members forming a first common plate of material and an outer panel of interconnected flange member forming a second common plate of material. Each of the flange members of the outer panel is joined to a respective one of the flange members of the inner panel in alignment therewith by one or more web members coupled between the inner panel and the outer panel such that the inner panel and the outer panel are spaced apart from one another and generally span alongside one another in a common direction of the frame assembly.

21 Claims, 4 Drawing Sheets

VEHICULAR STRUCTURAL FRAME ASSEMBLY

This application claims the benefit under 35 U.S.C.119(e) of U.S. provisional application Ser. No. 61/167,546, filed Apr. 8, 2009.

FIELD OF THE INVENTION

The present invention relates to a structural frame assembly which is suited for forming part of a structural frame, for example the structural frame of a vehicle, and more particularly relates to a structural frame assembly comprising a plurality of web members joined between interconnected flange members of an inner panel and an outer panel of the assembly.

BACKGROUND

Structural frames in vehicles are commonly assembled from a plurality of separate frame members of various cross sections including tubular members, I-beams and the like. The assembly of frames of various contours and shapes requires a complex arrangement of parts which are individually joined together so as to be costly and labour intensive to assemble.

U.S. Pat. No. 6,805,401 by Hayashi et al. discloses a vehicle floor structure in which a plurality of beam elements are assembled together and reinforced by continuous inner and outer flat sheets spanning the inner and outer sides of the frame respectively. The large number of beam elements formed with flanges at top and bottom edges thereof are limited in the shapes that can be formed due to the limitations of bending the flanges on the beam elements prior to assembly. The sheeted material which fully spans the inner and outer sides results in a large use of material even in places where minimal material is required for strength resulting in unnecessarily heavy construction which utilizes costly unnecessary material. Furthermore the beam elements require the extra top and bottom flanges thereof for support and attachment to the sheets so as to incur further costs for material not necessary for strength. Due to the continuously spanning nature of the inner and outer sheets, assembly requires all of the beam elements to be initially mounted onto one of the sheets for access to intermediate ones of the beam elements prior to any attachment of the second sheet. The assembly thus requires multiple steps of locating beam elements and subsequently welding the sheets separately from one another.

SUMMARY OF THE INVENTION

According to one aspect of the invention there is provided a structural frame assembly for use in a structural vehicular frame, the structural frame assembly comprising:

an inner panel comprising a plurality of elongate flange members interconnected with one another at spaced apart positions from one another to define a plurality of openings between the flange members;

the flange members of the inner panel being generally flat and being integrally joined with one another so as to define a first common plate of material;

an outer panel comprising a plurality of elongate flange members interconnected with one another at spaced apart positions from one another to define a plurality of openings between the flange members;

the flange members of the outer panel being generally flat and being integrally joined with one another so as to define a second common plate of material; and a plurality of web members joined between the inner panel and the outer panel such that the inner panel and the outer panel are spaced apart from one another and generally span alongside one another in a common direction of the frame assembly;

each of the flange members of the outer panel being joined to a respective one of the flange members of the inner panel in alignment therewith by at least one of the web members coupled between the inner panel and the outer panel.

By providing inner and outer panels formed only of flange members with spaces therebetween and further by locating the web members at the flange members, material can be readily concentrated at areas where strength is needed so as to minimize wasted material. The openings between the flange members further provide access to readily locate the web members spanning between the inner and outer panels to simplify the assembly process. Furthermore all of the web members can be mounted into place between the inner and outer panels in a manner in which the web members are supported prior to welding so that all of the welding assembly can be accomplished at one time. When providing web members connected between associated flange members of the inner and outer panels an I-beam type construction results which provides considerable strength to the resulting frame assembly. When further providing the web members in spaced apart pairs between the flange members of the inner and outer panels, a resulting tubular like frame structure is provided having inner and outer sides of the assembled frame structure which are formed of continuous plate material as opposed to conventional tubular frame structures which require a plurality of individual segments to be interconnected in complex configurations. The flat configuration of the flange members and the web members spanning therebetween readily permits all of the components of the frame assembly to be readily manufactured from plate material using a laser cutter for example to minimize manufacturing costs of the components of the frame assembly as compared to prior art configurations as well.

Preferably at least some of the web members are joined to the inner panel and the outer panel so as to be oriented perpendicularly to both the inner panel and the outer panel.

Preferably at least some of the web members span substantially a full width of the inner panel and the outer panel in the common direction of the frame assembly.

The plurality of web members may comprise at least one primary web member spanning at least partway across a width of the inner panel and the outer panel in the common direction of the frame assembly and a plurality of secondary web members spanning transversely to said at least one primary web member in abutment therewith at an intermediate location on the primary web member.

When each of the elongate flange members extends in a longitudinal direction within a plane of the common plate of material between opposing ends, preferably the elongate flange members increase in lateral dimension perpendicular to the longitudinal direction within said plane of the common plate of material towards the ends of the flange members which are joined with other ones of the flange members in the common plate of material. More particularly, the side edges of each flange member may be joined to the side edges of the other flange members interconnected transversely thereto by a curved transition.

Preferably the web members are interconnected in a grid formation in which at least some of the web members are joined perpendicularly to one another.

Preferably there is provided a pair of the web members mounted generally parallel and spaced apart from one another between at least some of the elongate flange members of the outer panel and the respective ones of the flange members of the inner panel in alignment therewith.

When each of the elongate flange members extends in a longitudinal direction within a plane of the common plate of material between opposing ends thereof and each of the elongate flange members has a width in a lateral direction oriented perpendicularly to the longitudinal direction between opposing side edges, preferably each of the pairs of the web members are spaced apart in the lateral direction by a distance which is near the width of the respective flange members between which the web members are connected.

Preferably the web members of each of the pairs of the web members are connected to the respective flange members adjacent the side edges thereof.

Preferably the flange members between which each of the pairs of the web members are connected have a width which is greater than the distance between the respective pair of web members such that the side edges of the flange members protrude outwardly in the lateral direction beyond the web members along a length of the flange members.

Some of the web members may include protrusions formed on respective inner and outer edges thereof which are received in corresponding apertures formed in the flange members of the inner panel and outer panel respectively.

Preferably each of the protrusions has a height relative to the respective edge of the web member which is less than a thickness of the respective inner and outer panels.

When each of the elongate flange members extends in a longitudinal direction within a plane of the common plate of material between opposing ends thereof, preferably the apertures receiving the protrusions of the web members therein are located adjacent the ends of the flange members.

When some of the elongate flange members are connected at opposing ends thereof to other ones of the flange members at intermediate locations thereon, preferably some of the apertures receiving the protrusions of the web members therein are located in said other ones of the flange members at said intermediate locations.

Preferably the flange members of the inner panel are formed integrally with one another from a unitary plate and the flange members of the outer panel are formed integrally with one another from a unitary plate.

In some instances, a distance between the inner panel and the outer panel and a corresponding height of the web members connected between the inner panel and the outer panel varies along a length of at least some of the web members.

In some instances, the inner panel and the outer panel comprises a portion which is curved in profile such that at least some of the web members have a side edge joined to said at least one of the inner panel and the outer panel which is similarly curved in profile.

The frame assembly may be provided in combination with an exterior vehicle body panel spanning an outer side of the outer panel and an interior vehicle body panel spanning an inner side of the inner panel.

The structural frame assembly may comprise a roof section of a vehicular frame, wherein at least some of the flange members of the inner and outer panels and the web members connected therebetween span a full width of the assembly between opposing sides of the vehicular frame.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
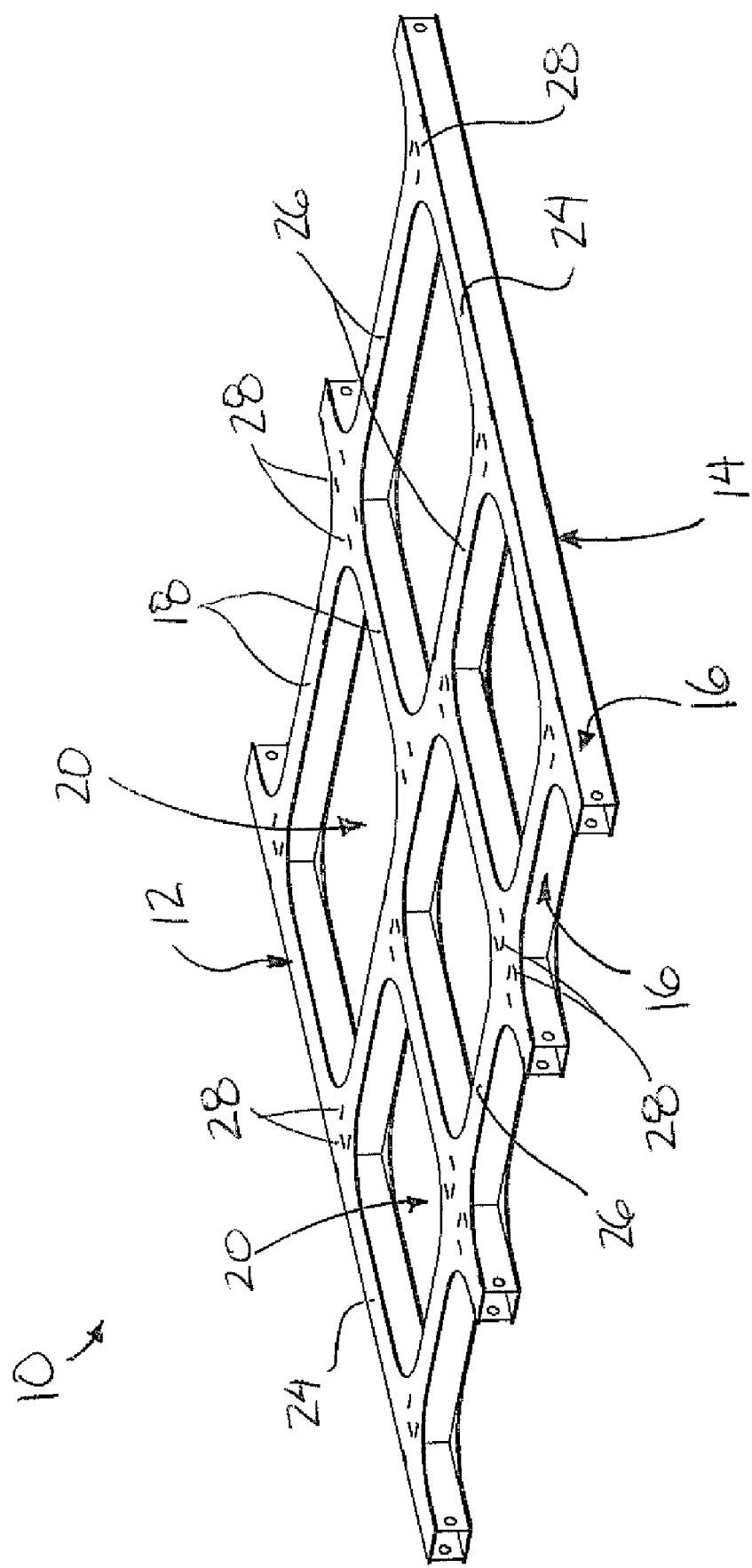
FIG. 1 is a perspective view of a structural frame assembly according to the present invention.

Referring to the accompanying figures there is illustrated a structural frame assembly generally indicated by reference numeral 10. The frame assembly 10 is particularly suited for use in forming a portion of a structural frame of a vehicle, for example the roof portion, a floor portion, or a sidewall thereof.

The structural frame assembly 10 generally comprises an inner panel 12 which is formed from a first unitary plate or sheet of rigid material such as metal, an outer panel 14 which is similarly formed from a secondary unitary plate or sheet of rigid material such as metal, and a plurality of web members 16 which are connected between the inner and outer panels.

Figure 4:
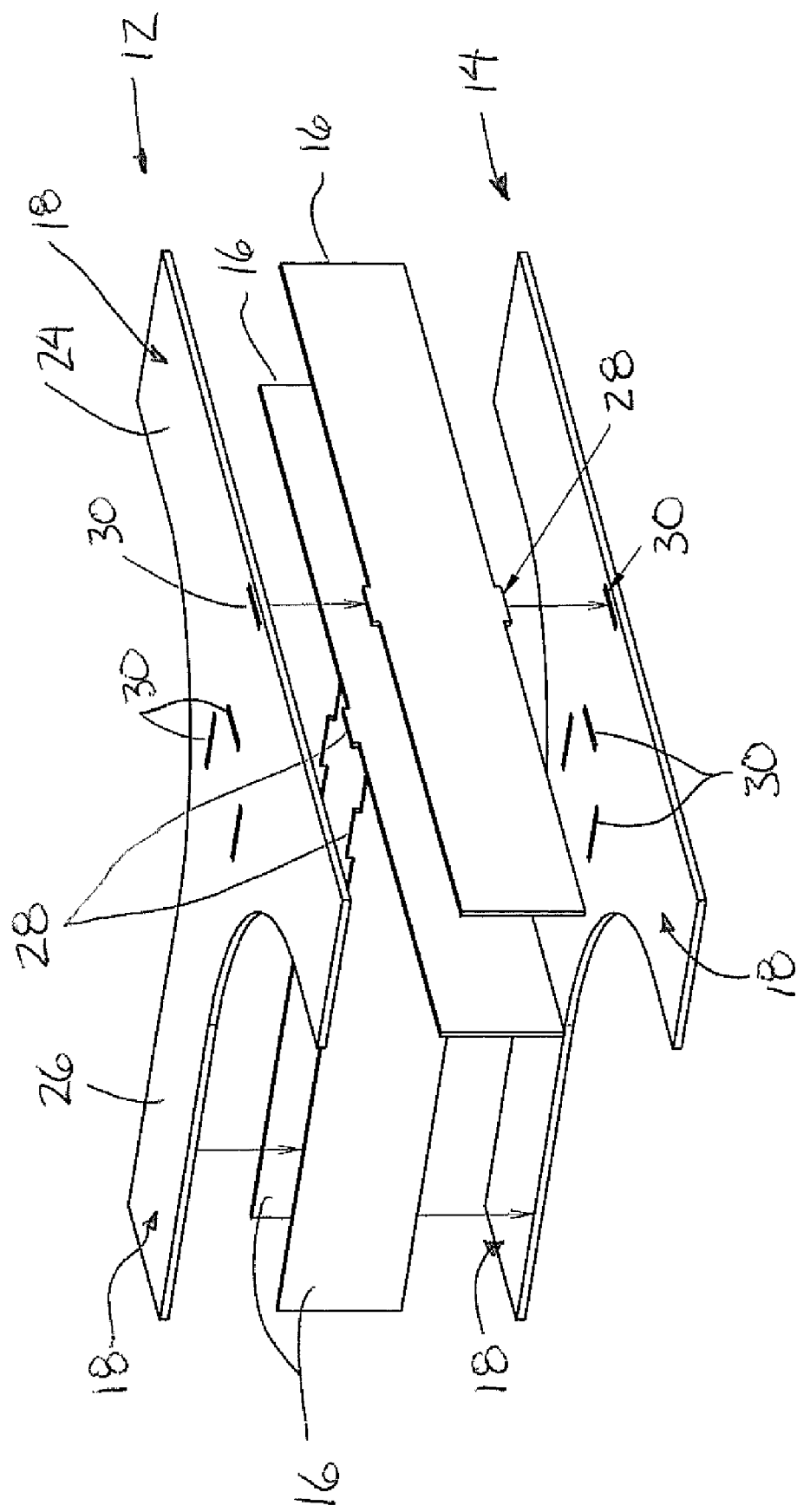
FIG. 4 is an exploded perspective view of an intersection between two flange members of the inner and outer panels and the web members connected therebetween.

The web members 16 support the inner and outer panels spaced apart with one another such that the inner and outer panels span generally alongside one another in a common direction that the frame assembly spans. When the web members 16 are all identical in height with one another, the inner and outer panels are supported parallel to one another as shown in FIG. 1. Alternatively a height of the web members and the profile thereof may vary along the length thereof so as to vary a height and orientation of the inner and outer panels relative to one another across the panel. The height can be increased at locations where additional strength is desired as the increased height of the web member will have more resistance against bending at the location of increased web member height in the resulting frame assembly. In the illustrated embodiment according to FIG. 4, the height is increased towards opposing ends of the frame assembly.

Each of the inner panel 12 and the outer panel 14 includes a plurality of openings formed therein to define a plurality of elongate flange members 18 which surround and separate the openings 20 in the panels and thereby define the openings. Each of the flange members 18 is elongate in a longitudinal direction between opposing ends thereof which are typically integrally connected with other ones of the flange members. Each of the flange members 18 is flat within the plane of the respective inner or outer panel so as to also have a width spanning in a lateral direction oriented perpendicular to the longitudinal direction thereof between a pair of opposing side edges 22 which are typically straight and extend in a longitudinal direction with the flange member between the opposed ends.

In a typical construction of the structural frame assembly 10 some of the flange members 18 comprise primary flange members 24 which span a large portion of or across a full width of the frame assembly. In the illustrated embodiments a pair of primary flange members 24 span across the full width of the frame assembly along two opposing sides of the assembly.

The frame assembly thus typically also comprises a plurality of secondary flange members 26 connected between the primary flange members so as to span a full width of the frame assembly in a second direction between the primary flange members along opposing sides of the assembly. Each of the secondary flange members 26 intersects one of the primary flange members 24 so as to be formed integrally therewith at respective intermediate locations defining intersecting points between the flange members at spaced apart positions along the primary or secondary flange members.

Figure 2:
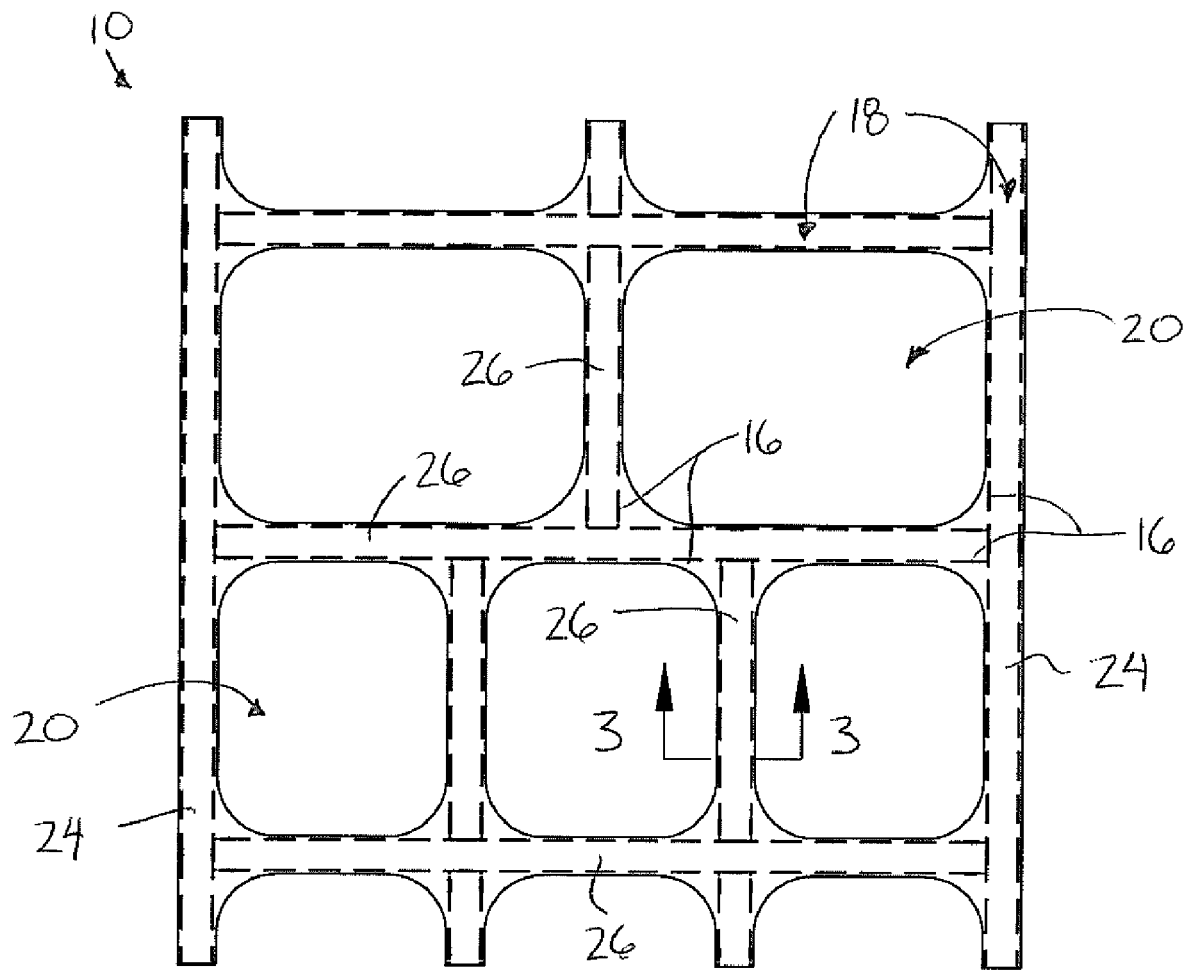
FIG. 2 is a top plan view of the structural frame assembly according to FIG. 1.
Figure 3:
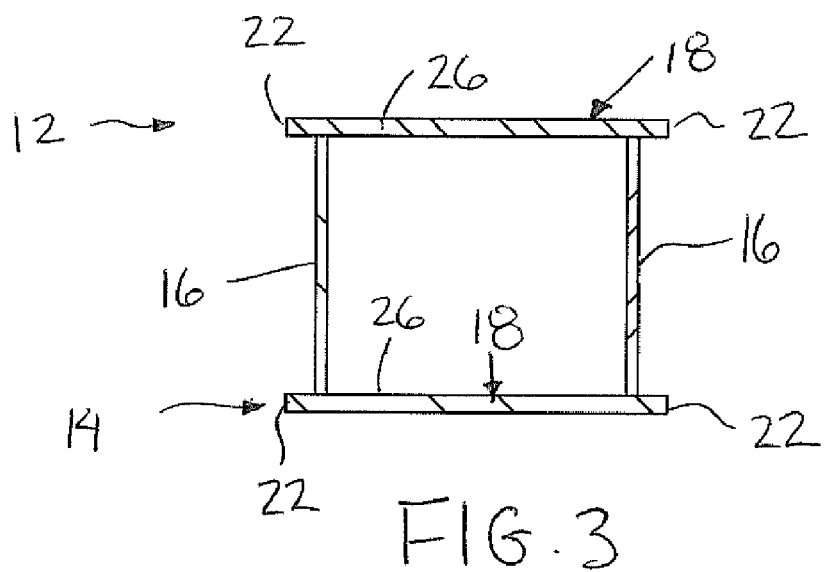
FIG. 3 is a sectional view along the line 3-3 of FIG. 2.

In the illustrated embodiment, intersecting ones of the flange members have respective longitudinal directions oriented perpendicularly to one another so as to define a rectangular grid formation of flange members when viewed from above as shown in FIG. 2. Depending upon where strength is desired in the frame assembly, the flange members may be oriented with the longitudinal directions thereof being perpendicular or any other transverse inclinations or orientations relative to other ones of the flange members. Furthermore, the flanges members may follow a curved path within the respective planes of the flange members and the web members connected between the flange members may follow similar curved paths. Additional secondary flange members may be connected between other primary or secondary flange members such that each of the secondary flange members is typically connected at opposing ends thereof to another flange member at an intermediate location thereon.

The flange members are all joined with one another at the intersections thereof by a radius of curvature such that the side edges 22 of intersecting flange members are formed continuously with one another to define a curved transition between the side edges of one flange member and the other flange member with which it is intersected. As a result of the curved transition, the width of each flange member is increased in the lateral direction towards the ends of the flange members from the central portion of the flange members which typically has a constant width along the length thereof.

The patterns of the interconnected flange members of the inner and outer panels are typically similar to one another so that each flange member of the inner panel is aligned with a corresponding flange member of the outer panel. Furthermore each of the flange members is joined with the respective flange member of the other panel in alignment therewith by one or more web members 16 connected therebetween.

In the illustrated embodiment, each flange member of the inner panel is substantially identical in shape and dimensions to the corresponding flange member of the outer panel. Alternatively, in further embodiments, the associated flange members of the inner panel and the outer panel may differ from one another. For example, when some extra strength is required in a specific bending mode, the flange member of one panel can be wider than the associated flange member of the other panel, or the flange members can be different in shape resulting in different shapes, sizes or numbers of openings in the different panels.

Each of the web members 16 is formed from a flat plate of material by cutting the web members from the plate using a suitable laser cutter for example. The web members are cut to have a suitable shape between respective inner and outer edges thereof such that the inner and outer edges are engaged with the inner and outer panels respectively along a full length of the web members and such that the profile of the inner and outer edges of the web members follows the profile of the inner and outer panels to which they are connected.

In the illustrated embodiments, the web members 16 are joined to each of the inner and outer panels so as to be perpendicular thereto. In further embodiments however, some or all of the web members may be oriented transversely at various inclinations relative to one or both of the inner or outer panels for accommodating attachments to the frame assembly for example.

In the illustrated embodiment, a pair of web members 16 connect each flange member of the inner panel with the respective one of the flange members of the outer panel with the pair of web members being typically parallel and spaced apart with one another. In this manner, when connected to the inner and outer panels an enclosed tubular structure is defined spanning the full length of the flange members in the longitudinal direction thereof. Each pair of web members is supported spaced apart in the lateral direction by a distance which is near to the width of the corresponding flange members in the lateral direction such that each web member is positioned adjacent and alongside a respective side edge of the respective flange members of the inner and outer panels. The width between the pair of web members is arranged to be slightly less than the width in the lateral direction of the corresponding flange members such that flange members are wider between the side edges thereof and the side edges protrude outwardly in the lateral direction beyond the web members along the full length of each flange member.

The web members follow the same pattern as the flange members such that each primary flange member includes a pair of primary ones of the web members associated therewith which span the full length of the flange members between the opposing ends thereof. Furthermore each of the secondary flange members includes secondary web members associated therewith which are connected between the primary web members so that the ends of the secondary web members are in abutment with other secondary web members or the primary web members at intermediate locations spaced along the length thereof with the web members being oriented perpendicularly to one another when in a rectangular configuration as shown in the illustrated embodiments.

In order to assist in assembling the inner and outer panels with the web members connected therebetween, a plurality of protrusions 28 are provided on both of the inner and outer edges of the web members for being received in corresponding mating apertures 30 formed in the inner and outer panels respectively. The protrusions 28 and mating apertures 30 are located adjacent opposing ends of the web members and flange members respectively at the location where the width in the lateral direction of the flange members increase. Where the end of a flange member intersects another flange member at an intermediate location thereon, the intermediate location of the flange member further comprises apertures therein which receive corresponding protrusions on the web members in alignment therewith.

The protrusions 28 are formed integrally with one another so as to be cut from the same plate as the body of the web members. The protrusions have a height projecting from the respective edge of the web member which may correspond to the thickness of the plate forming the inner and outer panels. In preferred embodiments, the protrusions have less height from the respective edges of the web members than the thickness of the plate to provide space for weld material which can be made flush with an outer surface of the respective panel. The lateral and longitudinal dimensions of the apertures are also arranged to closely fit the protrusions therein so that the protrusions and apertures can be mated together to accurately position the web members relative to the flange members of the inner and outer panels prior to welding therebetween. Due to the configuration of the inner and outer panels, all of the web members remain accessible through the openings in the panels during assembly thereof so that all of the assembly can take place in a single step with welding being accomplished subsequently in a single step as well.

In order to manufacture the components of the frame assembly 10, unitary continuous plates of unitary rigid material are provided from which the panels are cut by simply cutting the openings in the material to define the plurality of integrally joined flange members which are located relative to one another where strength in the finished frame assembly is required. Each of the panel members can be bent and curved so as to form the desired finished shape of the frame assembly while remaining a single unitary member so as to avoid the complexity of assembling separate individual parts when forming complex shapes of frame assemblies as required in the prior art.

Figure 5:
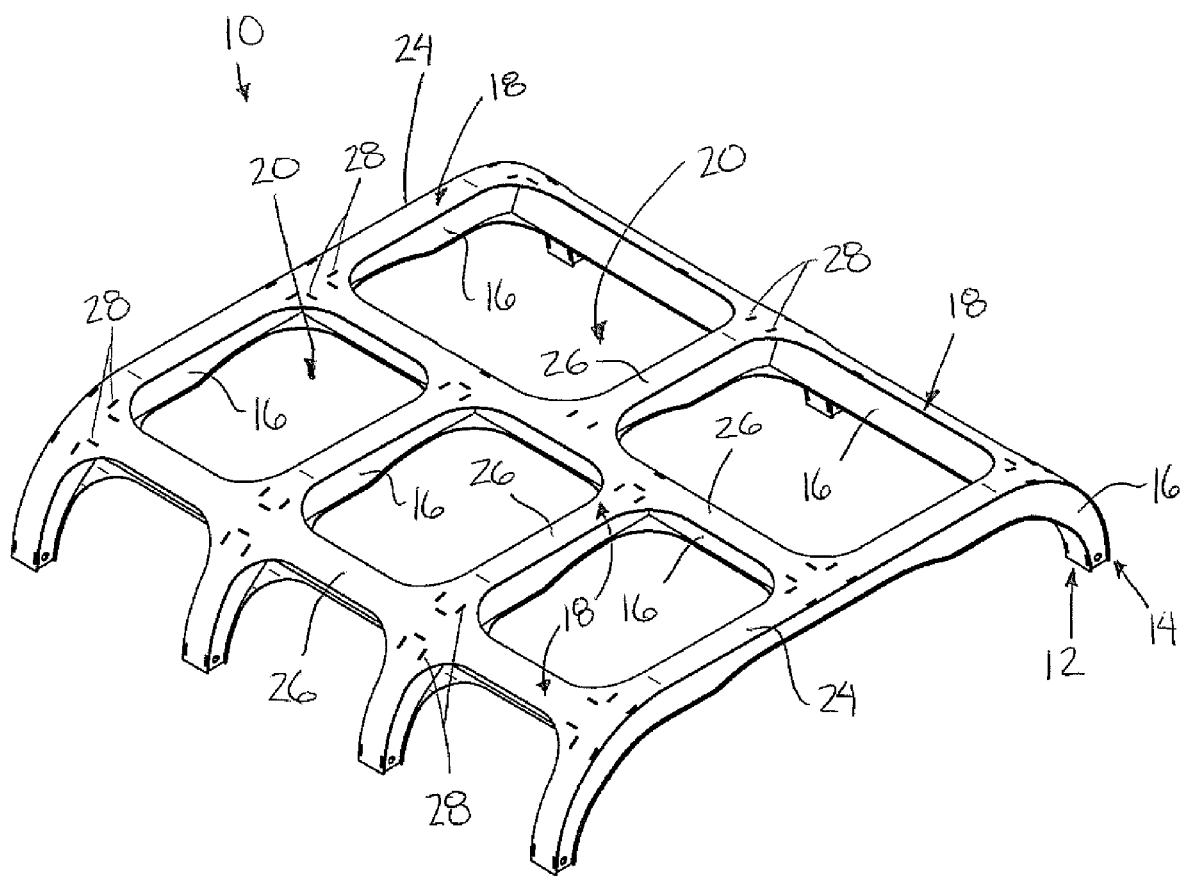
FIG. 5 is a perspective view of a further embodiment of the structural frame assembly.

Turning now more particularly to the embodiment of FIG. 5, the frame assembly 10 comprises the roof section of a vehicle in which the assembly is arranged to span a full width of a vehicle between side walls of the vehicular frame to which the opposing free ends of the flange members at opposing ends of the frame assembly are connected. In the assembly of FIG. 5, some of the flange members and the corresponding web members connected between the inner and outer panels are shown to span across a full width of the vehicular frame to provide primary support to the roof structure. The openings in the frame assembly can be specifically located at desirable access points through the frame structure, for example a location of vents or windows and the like. When used in a vehicle and the assembly 10 is joined integrally with the remainder of the structural frame of the vehicle, the openings in the frame are typically covered by supporting exterior body panels to span the outer side of the outer panel and interior body panels to span the inner side of the inner panel.

The frame assembly 10 of the present invention provides a light weight steel panel system which has many benefits as follows: a reduction in the number of parts, a reduction in assembly labour, the elimination of sensitive or expensive assembly fixtures, integral slots and tabs for self alignment of parts for assembly, a reduction in weight relative to strength, a reduction in connection stresses for grid style frameworks, a flexibility to create higher strength in required areas without adding unnecessary weight to adjacent areas, a flexibility to create complex shapes to accommodate attachments without adding significant costs, and a reduction in parts shipping costs and factory inventory space as all parts are formed from flat material.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A structural frame assembly for use in a structural vehicular frame, the structural frame assembly comprising:
an inner panel comprising a plurality of elongate flange members interconnected with one another at spaced apart positions from one another to define a plurality of openings between the flange members;
the flange members of the inner panel being generally flat and being integrally joined with one another so as to define a first common plate of material;
an outer panel comprising a plurality of elongate flange members interconnected with one another at spaced apart positions from one another to define a plurality of openings between the flange members;
the flange members of the outer panel being generally flat and being integrally joined with one another so as to define a second common plate of material; and
a plurality of web members joined between the inner panel and the outer panel such that the inner panel and the outer panel are spaced apart from one another and generally span alongside one another in a common direction of the frame assembly;
each of the flange members of the outer panel being joined to a respective one of the flange members of the inner panel in alignment therewith by at least one of the web members coupled between the inner panel and the outer panel.

2. The structural frame assembly according to claim 1 wherein at least some of the web members are joined to the inner panel and the outer panel so as to be oriented perpendicularly to both the inner panel and the outer panel.

3. The structural frame assembly according to claim 1 wherein at least some of the web members span substantially a full width of the inner panel and the outer panel in the common direction of the frame assembly.

4. The structural frame assembly according to claim 1 wherein the plurality of web members comprises at least one primary web member spanning at least partway across a width of the inner panel and the outer panel in the common direction of the frame assembly and a plurality of secondary web members spanning transversely to said at least one primary web member in abutment therewith at an intermediate location on the primary web member.

5. The structural frame assembly according to claim 1 wherein each of the elongate flange members extends in a longitudinal direction within a plane of the common plate of material between opposing ends and the elongate flange members increase in lateral dimension perpendicular to the longitudinal direction within said plane of the common plate of material towards the ends of the flange members which are joined with other ones of the flange members in the common plate of material.

6. The structural frame assembly according to claim 1 wherein each of the elongate flange members extends in a longitudinal direction within a plane of the common plate of material between opposing ends thereof and each of the elongate flange members has a width in a lateral direction oriented perpendicularly to the longitudinal direction between opposing side edges, the side edges of each flange member being joined to the side edges of the other flange members interconnected transversely thereto by a curved transition.

7. The structural frame assembly according to claim 1 wherein the web members are interconnected in a grid formation.

8. The structural frame assembly according to claim 1 wherein at least some of the web members are joined perpendicularly to one another.

9. The structural frame assembly according to claim 1 wherein there is provided a pair of the web members mounted generally parallel and spaced apart from one another between at least some of the elongate flange members of the outer panel and the respective ones of the flange members of the inner panel in alignment therewith.

10. The structural frame assembly according to claim 9 wherein each of the elongate flange members extends in a longitudinal direction within a plane of the common plate of material between opposing ends thereof and each of the elongate flange members has a width in a lateral direction oriented perpendicularly to the longitudinal direction between opposing side edges, each of the pairs of the web members being spaced apart in the lateral direction by a distance which is near the width of the respective flange members between which the web members are connected.

11. The structural frame assembly according to claim 10 wherein the web members of each of the pairs of the web members are connected to the respective flange members adjacent the side edges thereof.

12. The structural frame assembly according to claim 10 wherein the flange members between which each of the pairs of the web members are connected have a width which is greater than the distance between the respective pair of web members such that the side edges of the flange members protrude outwardly in the lateral direction beyond the web members along a length of the flange members.

13. The structural frame assembly according to claim 1 wherein at least some of the web members include protrusions formed on respective inner and outer edges thereof which are received in corresponding apertures formed in the flange members of the inner panel and outer panel respectively.

14. The structural frame assembly according to claim 13 wherein each of the protrusions has a height relative to the respective edge of the web member which is less than a thickness of the respective inner and outer panels.

15. The structural frame assembly according to claim 13 wherein each of the elongate flange members extends in a longitudinal direction within a plane of the common plate of material between opposing ends thereof, the apertures receiving the protrusions of the web members therein being located adjacent the ends of the flange members.

16. The structural frame assembly according to claim 13 wherein at least some of the elongate flange members are connected at opposing ends thereof to other ones of the flange members at intermediate locations thereon, some of the apertures receiving the protrusions of the web members therein being located in said other ones of the flange members at said intermediate locations.

17. The structural frame assembly according to claim 1 wherein the flange members of the inner panel are formed integrally with one another from a unitary plate and the flange members of the outer panel are formed integrally with one another from a unitary plate.

18. The structural frame assembly according to claim 1 wherein a distance between the inner panel and the outer panel and a corresponding height of the web members connected between the inner panel and the outer panel vary along a length of at least some of the web members.

19. The structural frame assembly according to claim 1 wherein at least one of the inner panel and the outer panel comprises a portion which is curved in profile such that at least some of the web members have a side edge joined to said at least one of the inner panel and the outer panel which is similarly curved in profile.

20. The structural frame assembly according to claim 1 in combination with an exterior vehicle body panel spanning an outer side of the outer panel and an interior vehicle body panel spanning an inner side of the inner panel.

21. The structural frame assembly according to claim 1 wherein the structural frame assembly comprises a roof section of a vehicular frame and wherein at least some of the flange members of the inner and outer panels and the web members connected therebetween span a full width of the assembly between opposing sides of the vehicular frame.

* * * * *